United States Patent [19]

Breher et al.

[11] Patent Number: 4,711,346

[45] Date of Patent: Dec. 8, 1987

[54] PLASTIC CONVEYOR BELT WITH EXTENSION-RESISTANT REINFORCEMENT AND DRIVE GEARING

[75] Inventors: Rudolf Breher, Porta Westfalica; Rudi Kölling, Vlotho, both of Fed. Rep. of Germany

[73] Assignee: BRECO Kunststoffverarbeitungs-GmbH & Co. KG, Porta Westfalica, Fed. Rep. of Germany

[21] Appl. No.: 774,124

[22] Filed: Sep. 9, 1985

[30] Foreign Application Priority Data

Sep. 12, 1984 [DE] Fed. Rep. of Germany ....... 3433379

[51] Int. Cl.$^4$ .............................................. B65G 15/30
[52] U.S. Cl. .................................. 198/844; 198/835; 24/31 R; 24/37
[58] Field of Search ............... 198/835, 836, 837, 844, 198/845, 847, 850; 474/202; 305/35 R, 35 EB, 38, 54; 24/31 R, 31 B, 31 C, 31 F, 31 L, 31 N, 37, 38

[56] References Cited

U.S. PATENT DOCUMENTS

| 3,209,897 | 10/1965 | Rice | 198/850 |
| 3,310,161 | 3/1967 | Kraft, Jr. | 198/847 |
| 3,327,359 | 6/1967 | Wiese | 24/37 |
| 3,643,792 | 2/1972 | Resener | 198/844 X |
| 3,726,569 | 4/1973 | Maglio et al. | 305/35 R |
| 3,865,229 | 2/1975 | Velander | 198/850 X |
| 3,910,404 | 10/1975 | Henrekson | 198/835 |
| 3,967,721 | 7/1976 | Rhoden | 198/835 |
| 4,078,654 | 3/1978 | Sarovich | 198/844 |

FOREIGN PATENT DOCUMENTS

| 2359712 | 6/1975 | Fed. Rep. of Germany | 24/31 R |
| 2280568 | 2/1976 | France | 198/850 |
| 0077146 | 5/1984 | Japan | 24/31 R |

*Primary Examiner*—Robert J. Spar
*Assistant Examiner*—Lyle Kimms
*Attorney, Agent, or Firm*—Jordan and Hamburg

[57] ABSTRACT

In order to achieve the ability to negotiate curves, the toothed-belt-like conveyor belt is formed in the plane of the conveyor belt by plates, which consist of a rigid, hard plastic, are at a distance from each other in the longitudinal direction of the belt and have a driving cog molded to their underside. Along the center line of the belt, the plates are connected together by a narrow rib, which is molded to the underside of the plates, is continuous in the longitudinal direction of the belt, stands out from the underside of the plates, consists of a soft, rubberlike, elastically deformable plastic, and contains an embedded tensional reinforcement.

2 Claims, 7 Drawing Figures

PLASTIC CONVEYOR BELT WITH EXTENSION-RESISTANT REINFORCEMENT AND DRIVE GEARING

The invention relates to a plastic conveyor belt with an extension-resistant reinforcement running in the longitudinal direction of the belt.

For example, for the manufacture of glass bottles or for filling glass bottles, conveyor belts are desired, which are supported on the guide rails of the conveyor belt understructure not with rollers, but directly in such a way that they will slide, so that the conveyor belt runs as free of vibrations as possible even at high transporting speeds, in order to prevent the transported bottles being jolted and thus toppled over and broken. Apart from being able to guide the conveyor belt around the tail pulleys of the understructure, it should also be possible to guide the belt, on which bottles are standing, through curves in the transporting plane. The link conveyor belts known for this purpose, in which metallic, plate-shaped belt links, spaced from each other in the longitudinal direction of the belt, are linked together through coupling joints in such a way that they can also negotiate curves, have the disadvantage that the belt links gliding on the understructure, as well as the guide rails of the understructure, which are also metallic as a rule, are subject to high frictional wear and that the coupling joints between the belt links also wear out and, by so doing, lead to an elongation of the conveyor belt. The frictional wear of a conveyor belt sliding on the guide rails of the understructure can be avoided with known toothed-belt-like plastic conveyor belts, whose most commonly used plastic, polyurethane, has good wear resistance and whose surfaces, which come into contact with the guide rails, can easily be coated with a nylon fabric with particularly good sliding properties during the manufacturing process of the conveyor belt. However, because of the extension-resistant wire inserts, which reinforce the conveyor belt in the plane of the wide, striated plastic belt bodies, these known toothed-belt-like plastic conveyor belts cannot negotiate curves. Even if the lateral edge regions of the striated plastic belt bodies were not reinforced and were divided into segments by slits originating from the side edges, a middle strip would still remain in any case, which would not permit the conveyor belt to negotiate curves, because of the necessary, tension-resistant reinforcement that is spread out two-dimensionally in the plane of the conveyor belt. The known tooth-belt-like plastic conveyor belts consists of a relatively soft, deformable plastic, so that the striated plsatic belt body can easily be bent in its longitudinal direction and readily be guided around the drive gearwheels or deflection pulleys of the conveyor belt understructure. Associated with this is, however, the disadvantage, especially for the transport of bottles, that the striated plastic belt body can also bend flexibly in a direction at right angles to the direction of the belt and can sag between the understructure rails carrying the conveyor belt edges. Bottles cannot be placed stably on the surface of a conveyor belt, which arches upwards or downwards in a direction at right angles to the belt.

It is an object of the invention to provide a plastic conveyor belt of the initially mentioned kind, which has and ensures a flat conveyor belt surface that is sufficiently hard and rigid especially for the bottle industry, which nevertheless is flexible in the longitudinal direction of the belt and, as an endless conveyor belt, can be guided without excessive work of deformation around the reversing sites of the conveyor belt understructure and which, moreover, can easily be deformed in the plane of the conveyor belt and be guided through belt curves.

For this toothed-belt-like plastic conveyor belt, which can easily be produced in any length as piece goods, the plates, manufactured from the rigid, hard plastic, form a flat-surfaced, conveyor belt upper side, having a stability and strength sufficient to prevent sagging in the longitudinal and cross directions, in order to be able to transport, for example, round bottles with the stability that is possible on a flat surface, by supporting the base of the bottles in circular fashion. On the other hand, the reinforced connecting rib, made from rubberlike, flexible plastic, together with the spacing of the plates at a distance from each other, enable the conveyor belt not only to run effortlessly around the drive gears or the like, but also to be guided easily through the curves in the transporting plane. Since, vertically to the plane of the conveyor belt, the connecting rib stands out from the underside of the plane and needs to be only very narrow for the extension-resistant connection of the plates to each other, the reinforcement embedded in it, which may comprise only a single, thicker wire rope in the cross section of the connecting rib, is also concentrated in a cross sectional plane of the conveyor belt perpendicular to the plane of the conveyor belt, so that the reinforced connecting rib easily can negotiate curves and also be guided around the reversal sites of the conveyor belt understructure. The rib can be so molded to the underside of the plates that, in the spaces between the plates, it extends up to the upper side of the plates and, over its width, forms a striated, continuous, level conveyor belt surface with the upper side of the plates. Exposed transverse plate edges, which could, for example, bump against the bottles to be transported and, because of a sudden acceleration, cause the bottles to overturn at the belt feeder site, are avoided by these means at the critical longitudinal center line of the belt, that is, in the region of the connecting rib. In order to avoid that the outer side of the conveyor belt in a curve lifts off from the guide rails of the understructure, thus causing the belt to slope, the driving prongs, molded to the underside of the plates, can be provided, at least at the ends of the prongs at the outer side of the curve, with a recess, which is constructed to fit into an understructure guide that engages the recess in a curve of the belt and secures the plates against lifting off from the conveyor belt understructure.

An example of the operation of the inventive conveyor belt is shown in the drawings.

DESCRIPTION OF THE PREFERRED EMBODIMENTS

Figure 1:
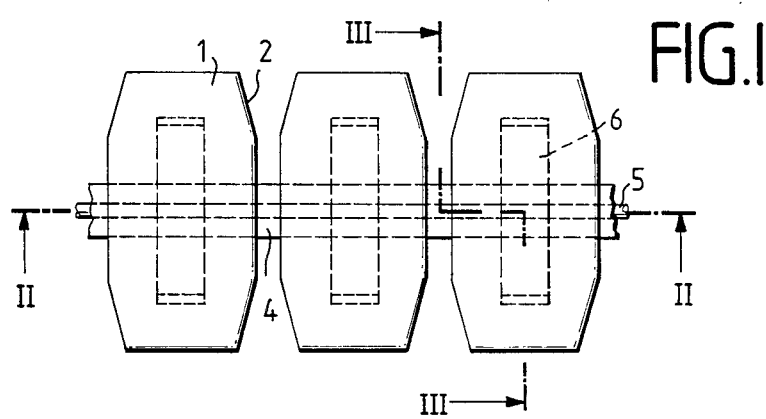
FIG. 1 shows a plan view of the conveyor belt.
Figure 2:
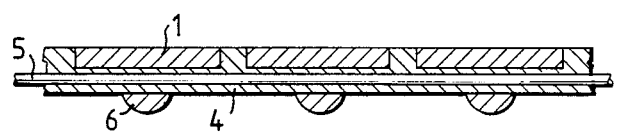
FIG. 2 shows a longitudinal section along the line II—II in FIG. 1.

The toothed-belt-like, reinforced conveyor belt, which is made from a plastic and able to negotiate curves, is formed by plates 1, the edges 2 of which, running transversely to the longitudinal direction of the belt, are at a distance from each other in the longitudinal direction of the belt. Molded to the underside 3 of each plate 1, there is a driving prong 6 of, preferably, the same plastic as the plates. Along the center line of the belt, the plates 1 are linked together by a narrow rib 4, which is continuous in the longitudinal direction of the belt, stands out from the underside 3 of the plates, contains an embedded tensional reinforcement 5 and, crossing the driving cogs, is molded to the underside of the plates. The plates 1 consist of a hard, rigid plastic, which endows the plates with sufficient stability and strength to resist bending in the longitudinal and transverse directions of the belt and with good abrasion resistance. On the other hand, the rib 4 consists of a soft, rubber-like, elastically deformable plastic, which endows the endless, revolving conveyor belt with sufficient flexibility for bending around the belt reversals and in belt curves and advisable is made from a class of plastics, which can enter into a fusion joint with the plastic of the plates.

Polyurethane, a plastic with good abrasion-resistant properties, which is customarily employed for toothed belts, is suitable for the conveyor belt. Preferably, a plastic with a Shore hardness A of 95 to 98, is used for the hard rigid plates and their driving cogs and a plastic of a Shore hardness A of 80 to 85 for the rubberlike, elastically deformable connecting rib.

The conveyor belt is preferably made by first of all prefabricating the connecting rib 4 of the soft plastic with the embedded reinforcement 5, for example, continuously as a strand in a first molding tool and then, in a second molding tool, through which the connecting rib is, for example, passed continuously, molding the plates 1 of hard plastic to the connecting rib 4, the driving cogs 6 of hard plastic, which cross the connecting rib 4, being also molded, at the same time, to the underside of the plates. With this method of manufacture, it is particularly easy to ensure that the the connecting rib 4 is prefabricated with indentations for receiving the plates 1, which are to be molded on, in such a manner, that the connecting rib 4, in the spaces between the plates 1, essentially extends up to the upper side of the plates 1 and that these sections of the soft plastic of the connecting rod, which extend up into the spaces, are coated and covered during the process of molding on the plates with a thin layer 11 of the hard plastic of the plates, which lies in the plane of the surface of the conveyor belt. With such a procedure, the advantage is achieved that the conveyor belt has a striated, continuous, level surface in the spaces between the plates and that, at the center line of the belt, surface interruptions are avoided, which, as the bottles slide on or are placed on the surface of the belt, could push suddenly against the perimeter of the bottles and, in so doing, cause the bottles to topple over, and that moreover the conveyor belt also has a surface, consisting of the hard and abrasion-resistant plastic, in the region of the spaces between the plates. The coating layer of hard plastic need only be very thin, and is therefore flexible enough to leave practically unimpaired the ability of the conveyor belt to negotiate curves, which is brought about by means of the flexible connecting rib.

Figure 3:
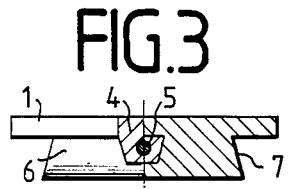
FIG. 3 shows a cross section along the line III—III in FIG. 1.
Figure 4:
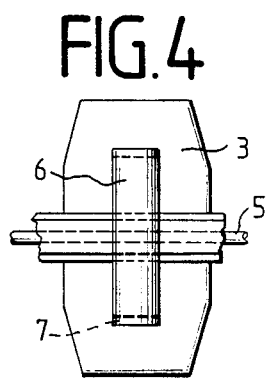
FIG. 4 shows a portion of the conveyor belt of FIG. 1 in a view from below.

As shown, for example, in FIG. 3, the driving cogs 6 under the plates 1 are fashioned so that they have at both ends of the cog, or at least at the one end of the cog that is at the outer side of a curve in the belt, a recess 7, which is fashioned to fit an understructure guide that engages this recess 7 at least in a curve in the belt and, by so doing, secures each plate 1 against lifting off from the conveyor belt understructure.

Figure 5:
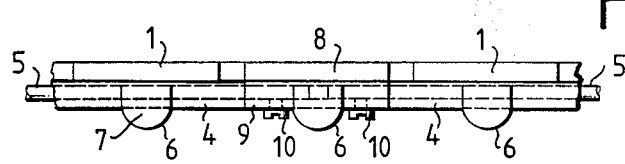
FIG. 5 shows a side view of the conveyor belt at the site of the endless connection of the two ends of the conveyor belt.
Figure 6:
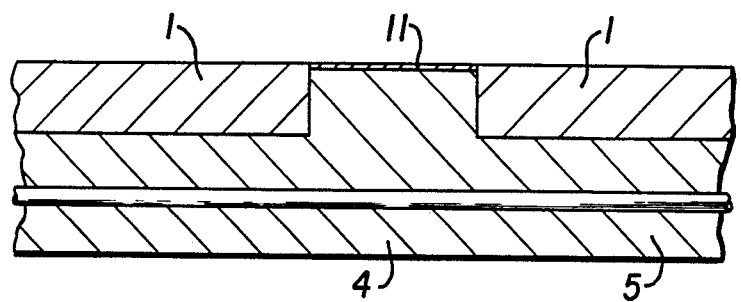
FIG. 6 is a partial view similar to FIG. 1 but on a larger scale.
Figure 7:
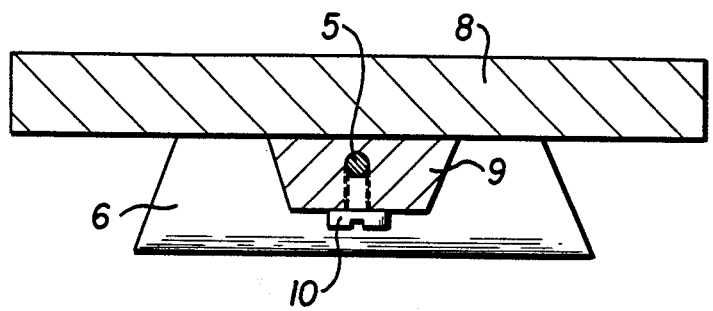
FIG. 7 is a cross-sectional view of FIG. 5.

In the above mentioned manufacturing process, the conveyor belt initially is made to have a finite length. In this connection and as shown in FIG. 5 and FIG. 7, the rib 4 at the two last plates 1, which form the ends of the conveyor belt that are to be connected together for an endlessly revolving conveyor belt, are so fashioned that the ends of the tensional reinforcement 5 protrude from the ends of the rib 4. Between these two plates 1, an intermediate plate 8 is arranged, which also may consist of the hard, rigid plastic and to the underside of which a driving cog 6 may be molded. At the underside of the intermediate plate 8 however, a rib piece 9 of metal is arranged, which crosses the driving cog 6 and which, in much the same was as the adhesive connection between the tensional reinforcement 5 and the plastic of rib 4, is connected through a strong metal-plastic bond with the plastic of the intermediate plate 8. The rib piece 9 is fashioned as a sleeve, so that the free ends of the tensional reinforcement 5 can be introduced into the rib piece 9 and firmly clamped therein by means of clamping screws 10, for example. The conveyor belt, initially of finite length, can in this way be closed into an endless conveyor belt with any number of plates 1 and correspondingly any circumferential length. Even in this endlessly connecting position, the rib 4 in the spaces between the plates 1 and the intermediate plate 8 can extend up to the upper side of these plate and moreover be covered with a thin layer of the hard plastic of the plates.

We claim:

1. An endless conveyor belt comprising a plurality of spaced plates of hard, rigid plastic material spaced from one another, each of said plates having a drive cog extending from the underside thereof, an elongated, soft elastically-deformable rib member attached to the underside of each of said plates to thereby connect said plates together, a tensional reinforcement means embedded in said rib member, said rib member crossing said drive cog, connecting means for connecting two ends of said rib member, said connecting means comprising an intermediate plate disposed between two of said spaced plates, an intermediate drive cog extending from the underside of said intermediate plate, a metal rib element extending through said intermediate drive cog, said metal rib element having a passage, said reinforcement means extending beyond the longitudinal ends of said rib member and extending into said passage, and clamping means on said metal rib member for clamping said reinforcement means in said passage.

2. An endless conveyor belt comprising a plurality of spaced plates of hard, rigid plastic material, each of said plates having a drive cog of the same hard plastic material integrally formed with said plate on the underside thereof, an elongated rib member of soft elastically deformable plastic material for connecting said plates together, said rib member having a tensional reinforcement means embedded therein, said rib member being attached to the underside of each of said plates by molding said plastic plates to said rib member, connecting means for connecting two ends of said rib member, said connecting means comprising an intermediate plate disposed between two of said hard, rigid plastic plates at the ends of said rib member, an intermediate drive cog extending from the underside of said intermediate plate, a metal rib element attached to the underside of said intermediate plate and crossing said intermediate drive cog, said metal rib element having a passage, said reinforcement means extending beyond the longitudinal ends of said rib member and extending into said passage, and clamping means on said metal rib element for clamping said reinforcement means in said passage.

* * * * *